United States Patent
Hot

(10) Patent No.: US 9,812,851 B2
(45) Date of Patent: Nov. 7, 2017

(54) SYSTEM AND METHOD OF ELECTRICAL WIRING AND DATA CABLING INSTALLATION

(71) Applicant: Alber Hot, Holmdel, NJ (US)

(72) Inventor: Alber Hot, Holmdel, NJ (US)

(*) Notice: Subject to any disclaimer, the term of this patent is extended or adjusted under 35 U.S.C. 154(b) by 0 days.

(21) Appl. No.: 15/400,336

(22) Filed: Jan. 6, 2017

(65) Prior Publication Data

US 2017/0194776 A1 Jul. 6, 2017

Related U.S. Application Data

(60) Provisional application No. 62/275,695, filed on Jan. 6, 2016.

(51) Int. Cl.
*H02G 3/04* (2006.01)
*H02G 3/12* (2006.01)
*H02G 3/38* (2006.01)
*H02G 3/08* (2006.01)
*H02G 3/22* (2006.01)

(52) U.S. Cl.
CPC ............ *H02G 3/128* (2013.01); *H02G 3/086* (2013.01); *H02G 3/22* (2013.01); *H02G 3/386* (2013.01)

(58) Field of Classification Search
CPC ........ H02G 3/128; H02G 3/386; H02G 3/086; H02G 3/22
USPC ........................................ 174/68.1
See application file for complete search history.

(56) References Cited

U.S. PATENT DOCUMENTS

| | | | | |
|---|---|---|---|---|
| 4,800,695 A | * | 1/1989 | Menchetti | H02G 3/286 174/482 |
| 4,910,938 A | * | 3/1990 | McGee | E04B 1/34321 52/481.2 |
| 4,971,280 A | * | 11/1990 | Rinderer | H02G 3/125 248/228.7 |
| 5,089,667 A | * | 2/1992 | Goussin | H02G 3/0437 138/117 |
| 5,792,992 A | * | 8/1998 | Handler | H02G 3/0431 174/101 |
| 6,180,878 B1 | * | 1/2001 | Gretz | H02G 3/0431 174/504 |
| 6,389,658 B1 | * | 5/2002 | Pfaller | F16B 2/245 220/3.9 |

(Continued)

*Primary Examiner* — Sherman Ng
(74) *Attorney, Agent, or Firm* — Meagher Emanuel Laks Goldberg & Liao, LLP

(57) ABSTRACT

A raceway system for electrical conductors in a wall includes an elongated raceway for passing electrical conductors therethrough. The elongated raceway has an upper portion configured to mechanically cooperate with a mounting junction box and a lower portion configured to mechanically cooperate with an outlet junction box. At least one clip is configured to receive the elongated raceway and secure the elongated raceway to a stud within the wall. The clip may be configured to flexibly receive the elongated raceway. An outlet junction box may be coupled to the lower portion of the elongated raceway, the outlet junction box configured for attachment to an inside surface of the wall to provide therethrough access to the electrical conductors. A mounting junction box may be coupled to the upper portion of the elongated raceway, the mounting junction box configured for attachment to an upper support member within the wall.

16 Claims, 3 Drawing Sheets

(56) References Cited

U.S. PATENT DOCUMENTS

2006/0000182 A1\* 1/2006 McGee ................ E04B 2/7453
52/775

\* cited by examiner

SYSTEM AND METHOD OF ELECTRICAL WIRING AND DATA CABLING INSTALLATION

CROSS-REFERENCE TO PRIOR FILED APPLICATIONS

This application claims priority to U.S. provisional application 62/275,695 filed on Jan. 6, 2016 which is incorporated herein in its entirety.

FIELD OF THE INVENTION

The present disclosure generally relates to construction of partitions and walls including electrical wiring and data cabling and, more particularly but not exclusively, to prefabricated raceways for use in such construction.

BACKGROUND

Generally speaking, building a wall or partition comprises the steps of i) rough carpentry work (framing), followed by rough electrical work (installation of electrical and/or communications wiring, cables, conduits, junction boxes and the like), followed by iii) finish carpentry work (drywall installation and the like), followed by iv) finish electrical work (installation of switches, electrical outlets, computer/telecommunications outlets and the like). These four steps form a critical project path associated with construction project where walls, partitions and the like are installed.

The time it takes to perform the various steps is dependent upon scheduling/coordination between carpenters and electricians. In addition, local and/or state regulatory agencies typically require the inspection of the rough electrical work prior to allowing the finish carpentry work to proceed. The net result is a relatively slow process where a job site is idle waiting for a carpenter or electrician to arrive and perform the next step in the process, or waiting for a state/local inspector to perform a required inspection, creating scheduling issues for the builder. Both the electrical roughing and the inspection process create scheduling issues for the builder such that larger projects may take 18 to 16 weeks to complete, increasing the cost of such projects.

SUMMARY OF THE INVENTION

Various deficiencies in the prior art are addressed by systems, methods and apparatus enabling performance of rough electrical work by carpenters during the performance of rough carpentry work.

A raceway system for electrical conductors in a wall is disclosed. The raceway system includes an elongated raceway for passing electrical conductors therethrough. The elongated raceway has an upper portion configured to mechanically cooperate with a mounting junction box and a lower portion configured to mechanically cooperate with an outlet junction box. At least one clip is configured to receive the elongated raceway and secure the elongated raceway to a stud within the wall. The clip may be configured to flexibly receive the elongated raceway. An outlet junction box may be coupled to the lower portion of the elongated raceway, the outlet junction box configured for attachment to an inside surface of the wall to provide therethrough access to the electrical conductors. A mounting junction box may be coupled to the upper portion of the elongated raceway, the mounting junction box configured for attachment to an upper support member within the wall.

A first elongated raceway may be configured for passing electrical power conductors therethrough and a second elongated raceway may be configured for passing electrical signal conductors therethrough. The second elongated raceway may comprise an upper portion configured to mechanically cooperate with the mounting junction box and a lower portion configured to mechanically cooperate with a second outlet junction box. At least one clip may be configured to receive the second elongated raceway and secure the second elongated raceway to a stud within the wall.

The raceway system may include a substantially U-shaped raceway configured for installation between adjacent studs within a wall, the raceway comprising two upper portions and a lower portion coupled therebetween for passing electrical conductors therethrough. Each of the upper portions may have an end configured to mechanically cooperate with a respective mounting junction box. Each of the upper portions may have at least one fastener configured to secure the upper portion of a respective one of the adjacent studs within the wall. The lower portion may include at least one outlet junction box configured for attachment to an inside surface of the wall to provide therethrough access to the electrical conductors. A plurality of electrical service conductors may be disposed within a first of the raceway upper portions and a first outlet junction box. A plurality of communications service conductors disposed within a second of the raceway upper portions and a second outlet junction box. The substantially U-shaped raceway may be formed of two substantially L-shaped portions. The substantially U-shaped raceway is disposed in a cavity formed between two studs in the wall.

A method for installing a raceway system for electrical conductors in a wall is also disclosed. The method includes providing an elongated raceway for passing electrical conductors therethrough, the elongated raceway comprising an upper portion configured to mechanically cooperate with a mounting junction box and a lower portion configured to mechanically cooperate with an outlet junction box. The elongated raceway is secured to a stud within the wall using at least one clip configured to receive the elongated raceway and secure the elongated raceway to the stud. The clip may be configured to flexibly receive the elongated raceway. An outlet junction box may be coupled to the lower portion of the elongated raceway, the outlet junction box configured for attachment to an inside surface of the wall to provide therethrough access to the electrical conductors. A mounting junction box may be coupled to the upper portion of the elongated raceway, the mounting junction box configured for attachment to an upper support member within the wall.

A first elongated raceway may be configured for passing electrical power conductors therethrough. A second elongated raceway may be configured for passing electrical signal conductors therethrough, the second elongated raceway comprising an upper portion configured to mechanically cooperate with the mounting junction box and a lower portion configured to mechanically cooperate with a second outlet junction box. At least one clip may be configured to receive the second elongated raceway and secure the second elongated raceway to a stud within the wall.

A substantially U-shaped raceway may be provided and configured for installation between adjacent studs within a wall, the raceway comprising two upper portions and a lower portion coupled therebetween for passing electrical conductors therethrough. Each of the upper portions may have an end configured to mechanically cooperate with a respective mounting junction box. At least one fastener may be provided for each of the upper portions to secure the upper portion of a respective one of the adjacent studs within the wall. The lower portion may include at least one outlet junction box configured for attachment to an inside surface of the wall to provide therethrough access to the electrical conductors. A plurality of electrical service conductors may be disposed within a first of the raceway upper portions and a first outlet junction box. A plurality of communications service conductors may be disposed within a second of the raceway upper portions and a second outlet junction box. The substantially U-shaped raceway may be formed from two substantially L-shaped portions. The U-shaped raceway may be disposed in a cavity formed between two studs in the wall.

BRIEF DESCRIPTION OF THE FIGURES

To facilitate understanding, identical reference numerals have been used, where possible, to designate identical elements that are common to the figures.

DETAILED DESCRIPTION

Figure 1:
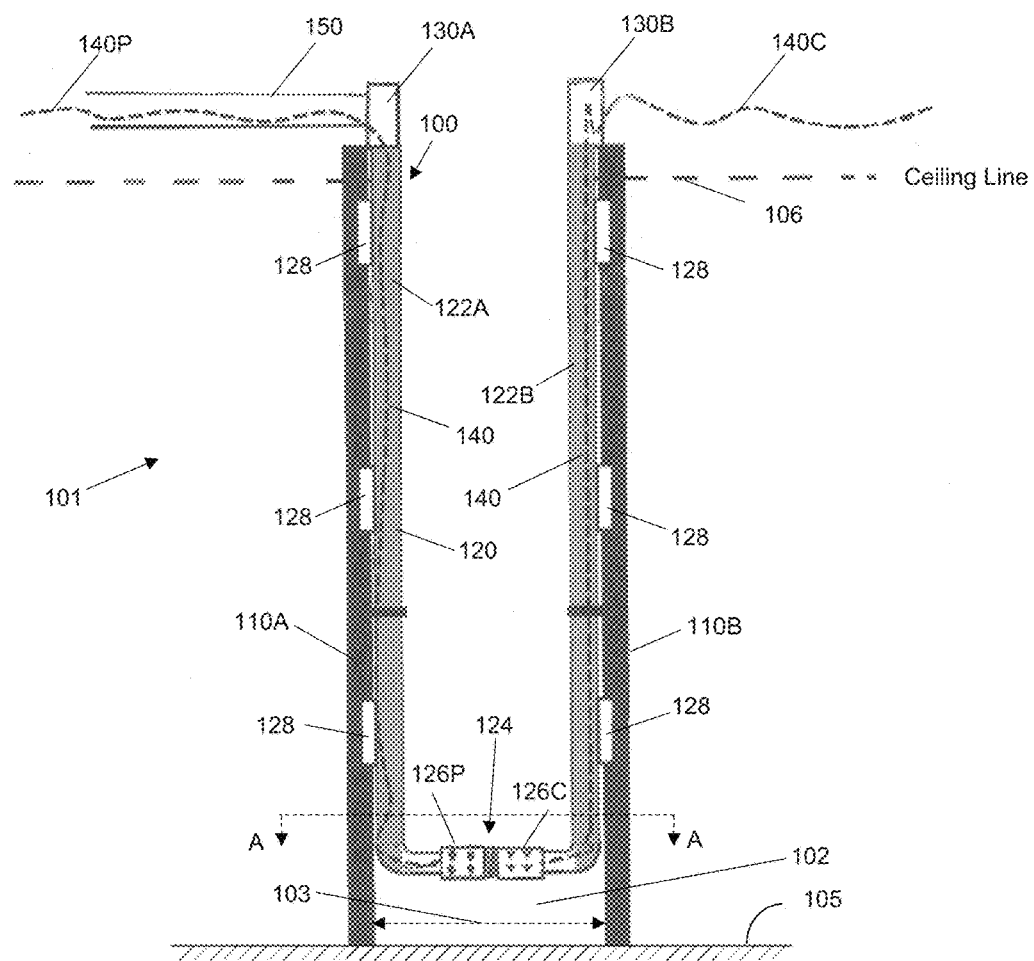
FIG. 1 shows a portion of a wall with a raceway system according to one embodiment.

Disclosed herein are systems, methods and apparatus enabling performance of rough electrical work by carpenters during the performance of rough carpentry work. The following description and drawings merely illustrate the principles of the invention. It should be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Part of the inventor's contribution rests in the recognition that the scheduling process associated with various construction projects may be improved by providing a new type of rough electrical system denoted herein as a "raceway" which may be installed by carpenters rather than by electricians. In this manner, the roles of both carpenters and electricians within the context of the critical project path are consolidated, thereby reducing the amount of time necessary to complete a project and the project's associated costs.

In various embodiments, a rough electrical system includes a first prefabricated raceway configured for high-voltage electrical wiring/cabling for subsequent connection to electrical power outlets and the like during the finish electrical work step. While it is contemplated that the wiring/cabling would be included within the first prefabricated raceway at the time of installation, some embodiments of the first prefabricated raceway are configured to accept the installation of wiring/cabling at a later date.

In various embodiments, a rough electrical system includes a second prefabricated raceway configured for low voltage computer network and/or telephone wiring/cabling for subsequent coupling to computer network and/or telecommunications outlets and the like during the finish electrical work step. The wiring/cabling may be included within the second prefabricated raceway at the time of installation or may be installed at a later date.

The first and second raceways are sized to hold sufficient wiring/cabling for the intended construction. For example, a typical high-voltage raceway may hold sufficient wiring/cabling to feed up to eight electrical power receptacles from one two-sided outlet junction box as part of a high-voltage assembly. Wiring/cabling supporting one or more voltage levels (e.g., 120V, 240V, low voltage and the like) as well as more or fewer electrical power receptacles is also contemplated. Similarly, a typical low voltage raceway may hold sufficient wiring/cabling to feed up to eight computer network/communications outlets as part of a low-voltage assembly. The low-voltage assembly may also include wiring/cabling supporting switches and control signals associated with building automation, lighting control and the like.

While generally described as separate high-voltage and low-voltage raceways, those skilled in the art will understand that with proper insulation, raceway sizing and the like both high-voltage and low-voltage wiring/cabling may be included within a single raceway. In various embodiments, a high-voltage raceway will be utilized to install electrical power wiring/cabling immediately while a voltage raceway will be utilized to enable subsequent installation of low-voltage wiring/cabling In various embodiments, to give installers visual cues or ensure that the appropriate wiring/cabling is pulled through a raceway, raceways may be color-coded depending upon the type of wiring/cabling included therein such as for power (e.g. orange), communications (e.g., yellow), lighting (e.g., green), HVAC control (e.g., blue) and fire alarm/security (e.g., red). Any color coding scheme may be employed.

In various embodiments, a raceway adapter installed during the rough carpentry phase of construction by carpenters rather than electricians. The raceway adapter is accessed by electricians during the finish electrical phase of construction to install thereby that power outlets, switches, computer network receptacles, telephone receptacles, building automation/control receptacles and the like FIG. 1 shows a portion of a wall 101 with a raceway system according to one embodiment. The raceway system is configured for passing electrical conductors therethrough.

In particular, FIG. 1 depicts an embodiment of raceway system 100 installed in accordance with one installation method.

In this example, only a portion of a wall 101 is shown. FIG. 1 is generally a front cutaway (without insulation and without drywall panels installed) showing two studs 110 (110A and 110B) disposed generally vertically between a floor or base portion 105 and a ceiling shown generally by ceiling line 106. In some embodiments the studs are coupled to a bottom or sole plate (not shown) as is well known in the art. In some embodiments the studs are extended above the ceiling line and a drop ceiling is then coupled to the studs forming a ceiling structure (not shown) as is also well known in the art. Wall 101 includes a first vertically oriented stud 110A and a second vertically oriented stud 110B. The studs 110 may be formed using wood, metal or any other construction material. The studs 110 are typically separated by a standard distance such as 16 inches (40.64 cm) on center, 24 inches (60.96 cm) on center or some other standard distance, depending upon the relevant construction code. As such, the two depicted studs 110A and 110B are illustrative only since a wall will typically comprise more than two studs 110.

Assume for this example that studs 110 are standard 2×4 s with a standard dimension of 1.5 inches by 3.5" mounted on 16 inch centers. This results in a standard cavity 102 having a width 103 of 14.5 inches. It is understood that the studs generally have a length that is selected based on the desired ceiling height such as 8-10 feet depending on the application. It should be understood that any ceiling height can be accommodated without departing from the scope of this disclosure. Raceway 120 is disposed between the two studs 110. The raceway 120 is generally prefabricated and is formed as an elongated channel. In this example the raceway is formed into a U-shaped profile as discussed below. The raceway is generally sized in accordance with the cavity width formed between the studs 110. In various embodiments, the raceway 120 is formed as a single prefabricated U-shaped element. In various embodiments, the raceway 120 is formed as two prefabricated L-shaped elements which, when joined, form the raceway 120.

In this example, the raceway 120 comprises a first upper portion 122A, a second upper portion 122B and a lower portion 124. The first upper portion 122A mechanically cooperates with or is generally coupled to stud 110A. The second upper portion may 122B mechanically cooperates with or is generally coupled to stud 110B. The lower portion 124 generally spans the width 103 of cavity 102 (or portion thereof) formed between the two studs 110A and 110B. The lower portion 124 is generally formed of one or more 90 degree elbow sections coupled between the upper portion and a horizontal portion formed with one or more outlet junction boxes. In this example, the lower portion 124 is connected between lower ends of the first 122A and second 122B upper portions of the raceway 120. In this example, the lower portion 124 includes one or more outlet junction boxes 126, illustratively an electrical power outlet junction box 126P and a computer network/communications junction box 126C. The raceway 120 is preferably sized such that when installed the height of the one or more junction boxes 126 above floor 105 is of an appropriate height, e.g., 16" to the top of the electrical box from the floor, for the type of wall being constructed.

It should be understood that the raceway may be sized in a variety of widths. The raceway may be coupled to a single stud with a lower portion having a width selected to span only a portion of the width 103 of cavity 102. The raceway may be produced in a variety of width increments e.g., 6 inch increments. This will allow the raceway to be used in situations where the spacing between the studs is non-standard. It should be understood that in the example discussed above, two outlet junction boxes are shown. Fewer or additional junction boxes may be used as can be accommodated by the selected width.

In various embodiments, the raceway 120 is secured within the cavity 102 via one or more optional mounting clips 128 which operate to secure one or both of the first 122A and second 122B upper portions of the raceway 120 to a respective stud 110. In this example, three mounting clips 128 are shown as securing each of first 122A and second 122B upper portions of the raceway 120 to, respectively, first stud 110A and second stud 110B. It should be understood that more or fewer mounting clips 128 may be used without departing from the scope of this disclosure. Moreover, mounting clips 128 may be used on only one of the first 122A and second 122B upper portions of the raceway 120 if such a configuration provides sufficient mechanical support to the raceway 120.

In various embodiments, the raceway 120 is secured within the cavity 102 via one or more optional mounting junction boxes 130 which connect to and upper support member such as the respective top ends of one or both of the first 122A and second 122B upper portions of the raceway 120. For example, in some embodiments such as that depicted in FIG. 1, an upper end of the first upper portion 122A is coupled to a mounting junction box 130A. The mounting junction box 130A may be used to couple a wiring conduit 150 to the first upper portion 122A of the elongated raceway 120 such that electrical conductors 140 may pass therethrough.

The raceway 120 may be formed using electrical conduit having a circular, rectilinear or other cross-section. The raceway 120 may be formed using metal conduit, polyvinyl chloride (PVC) conduit, or conduit made from other forms of plastic, metallic or composite materials (or combinations thereof). In general, the size and material used to for raceway 120 will be based on the material sizing and the type of materials that conform with the applicable construction codes for the jurisdiction in question. It should be understood that construction codes may vary between different areas in the United States as well as different countries.

In various embodiments, one or both of electrical power conductors shown generally by reference number 140P and computer network/communications conductors shown generally by reference number 140C may be conveyed via the upper and lower portions of the elongated raceway to appropriate out the junction boxes 126. In this example, electrical power conductors 140P are routed to power out the junction box 126P via conduit 150, mounting junction box 130A and first upper portion 122A. Similarly, computer network/communications conductors 140C are routed to computer network/communications junction box 126C via second upper portion 122B.

It is noted that a typical requirement of local electrical and construction codes is to route electrical power conductors 140P via conduit 150, mounting junction box 130 and/or other similar mechanisms due to the high-voltage/high-power signals conveyed by such conductors. It is further noted that there are often no requirement to route computer network/communications conductors 140C via conduit or via a mounting junction box 130B due to the low-voltage/low-power signals conveyed by such conductors.

Figure 2:
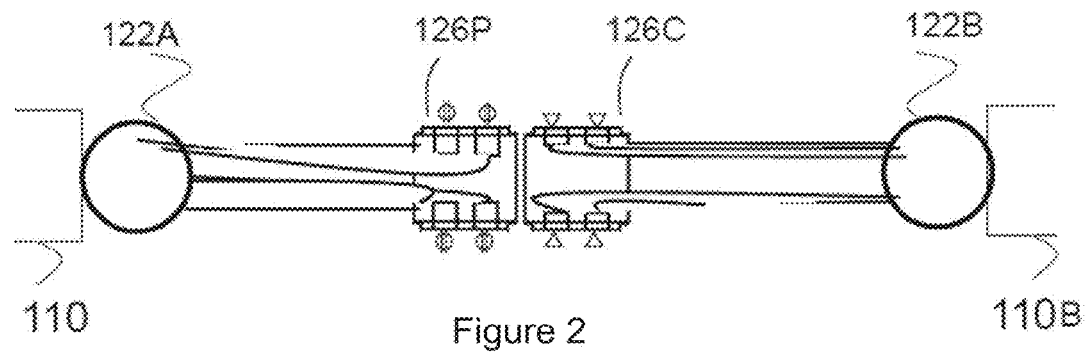
FIG. 2 shows a partially blown-apart view of a cabling raceway according to one embodiment.

FIG. 2 shows a partially blown-apart view of a cabling raceway according to one embodiment. In particular, FIG. 2 shows a sectional view looking downward along section A-A of the raceway 120 of FIG. 1. In this example, first upper raceway 122A and second upper raceway 122B have a cylindrical cross section that mechanically cooperate with respective first 110A and second 110B studs. The lower raceway portion 124 including the electrical power outlet junction box 126P and a computer network/communications junction box 126C are visible. As previously noted, when the finish electrical work is performed by an electrician, appropriate outlets will be mechanically and electrically coupled to wires within the electrical power outlet junction box 126P and a computer network/communications junction box 126C.

Figure 3:
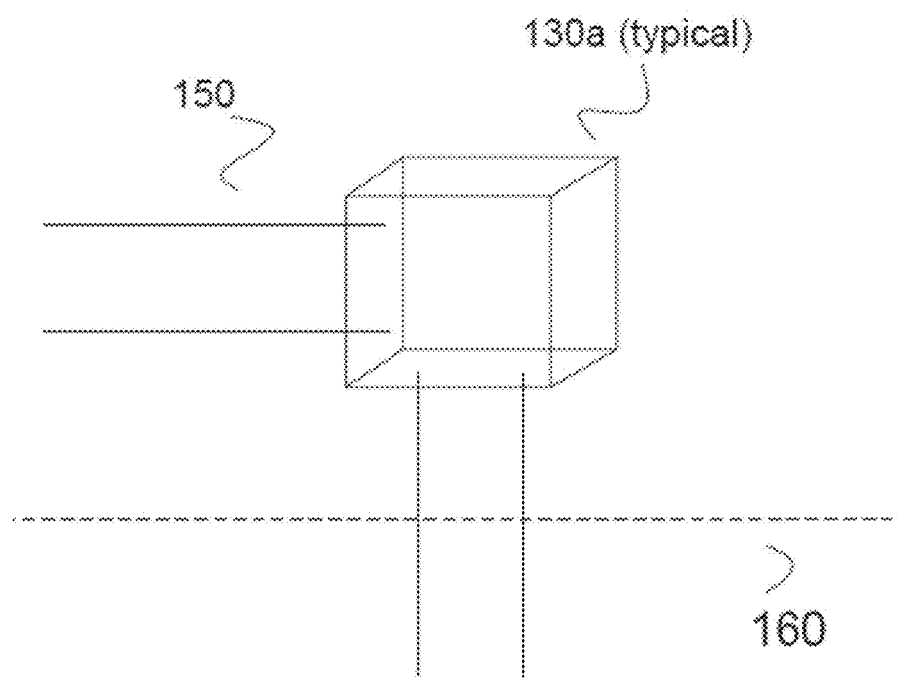
FIG. 3 shows an exemplary raceway junction box suitable use with the raceway system of FIG. 1.

FIG. 3 shows an exemplary raceway junction box suitable use with the raceway system of FIG. 1. In particular, the raceway junction box 130 may be used to connect conduit 150 and an upper raceway portion 122 as discussed herein.

Figure 4:
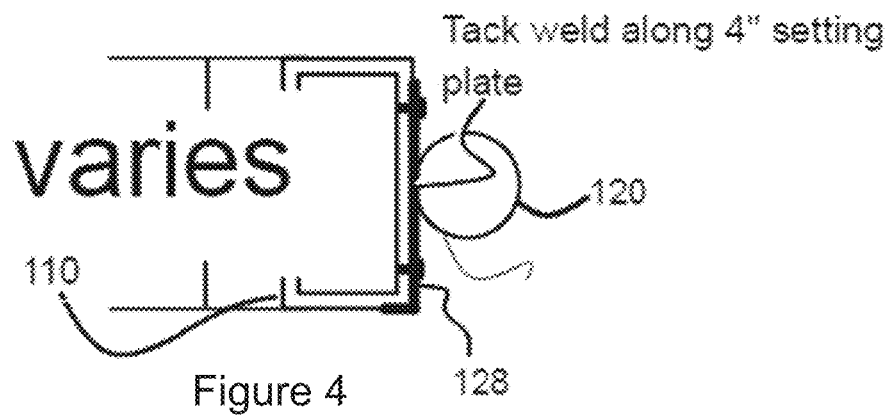
FIG. 4 shows an exemplary single raceway clip suitable use with the raceway system of FIG. 1.

FIG. 4 shows an exemplary single raceway clip suitable use with the raceway system of FIG. 1. In particular, FIG. 4 shows a top down view of a stud 110 having attached thereto a clip 128, which clip includes a plate for securing thereto a raceway conduit 120 such as, illustratively, via a tack weld or other fastening means (e.g., nail, screw, adhesive and so on). The clip may be configured to flexibly receive the raceway to provide for some mechanical movement between the stud and the raceway.

Figure 5:
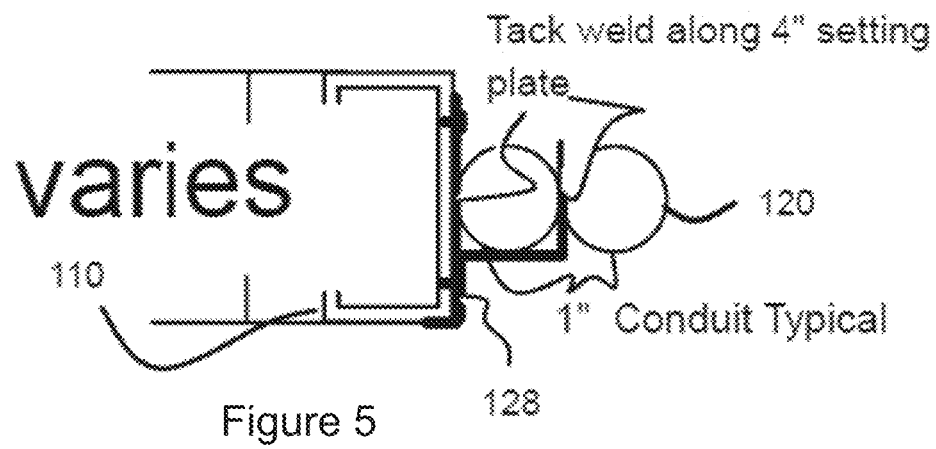
FIG. 5 shows an exemplary double raceway clip suitable use with the raceway system of FIG. 1.

FIG. 5 shows an exemplary double raceway clip suitable use with the raceway system of FIG. 1. In particular, FIG. 5 is similar to FIG. 4 except that a second plate extends from the first plate for securing thereto a second raceway conduit 120 such as, illustratively, via a tack weld or other fastening means.

Figure 6:
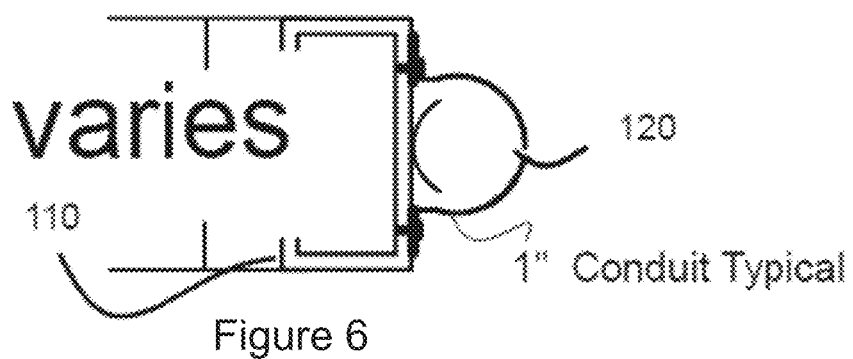
FIG. 6 shows an exemplary outer raceway clip suitable use with the raceway system of FIG. 1.

FIG. 6 depicts an exemplary outer raceway clip suitable use with the raceway system of FIG. 1. In particular, FIG. 6 is similar to FIG. 4 except that instead of securing the raceway conduit 122 a plate, the raceway conduit 120 is held or trapped against the stud 110 within a cavity formed by the clip 128.

The various embodiments described herein allow carpenters to install prefabricated raceways for the wiring to be installed at a later date. These raceways will hold electrical wiring that will feed up to 8 outlets from one junction box. These raceways will allow for the future installation of outlets, without requiring major demolition. The blue boxes serve as placeholders for the outlets.

If carpenters can work without disruption until all walls are up, licensed electricians can then come to wire the outlets through the raceways, taking less time for the entire process to be completed.

One embodiment of the invention comprises a Raceway adapter for installation within walls by carpenters rather than electricians. The Raceway may be accessed by electricians during the "finish" portion of the electrical work. In particular, to install an outlet, switch, computer plug and the like, the electrician merely opens the wall (i.e., cuts the sheetrock) at the appropriate location where the Raceway is placed. Electrician then makes the necessary electrical mechanical connections between the Raceway wiring and the outlet, switch, computer plug and the like to provide a finished electrical installation.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

Further description of the disclosed process and system is included in U.S. provisional application 62/159,542 filed May 11, 2015 and its appendix which are incorporated by reference in their entirety as if fully set forth herein. In addition, the references listed herein and all references listed in U.S. provisional application 62/159,542 filed May 11, 2015 and its appendix are also part of the application and are incorporated by reference in their entirety as if fully set forth herein.

It should be understood that many variations are possible based on the disclosure herein. Although features and elements are described above in particular combinations, each feature or element can be used alone without the other features and elements or in various combinations with or without other features and elements.

What is claimed is:

1. A raceway system for electrical conductors in a wall comprising: a first elongated raceway configured for passing electrical power conductors therethrough, the first elongated raceway comprising an upper portion configured to mechanically cooperate with a first mounting junction box and a lower portion configured to mechanically cooperate with a first outlet junction box, said first elongated raceway configured to be secured to a first stud within the wall; and a second elongated raceway configured for passing electrical signal conductors therethrough, the second elongated raceway comprising an upper portion configured to mechanically cooperate with a second mounting junction box and a lower portion configured to mechanically cooperate with a second outlet junction box said second elongated raceway configured to be secured to a second stud within the wall.

2. The raceway system of claim 1, wherein said first elongated raceway is secured to said stud within said wall using a clip configured to flexibly receive the first elongated raceway.

3. The raceway system of claim 1, further comprising a respective first or second outlet junction box coupled to the lower portion of at least one of the first and second elongated raceways, each outlet junction box configured for attachment to an inside surface of the wall to provide therethrough access to the electrical conductors.

4. The raceway system of claim 1, further comprising a respective first or second mounting junction box coupled to the upper portion of at least one of the first and second elongated raceways, each mounting junction box configured for attachment to an upper support member within the wall.

5. The raceway system of claim 1, wherein said second elongated raceway is secured to said second stud within said wall using a clip configured to flexibly receive the second elongated raceway.

6. A raceway system for electrical conductors within a wall, comprising: a substantially U-shaped raceway configured for installation between adjacent studs within a wall, the raceway comprising two upper portions and a lower portion coupled therebetween for passing electrical conductors therethrough; each of the upper portions having an end configured to mechanically cooperate with a respective mounting junction box; each of the upper portions having at least one fastener configured to secure the upper portion of a respective one of the adjacent studs within the wall; the lower portion including at least one outlet junction box configured for attachment to an inside surface of the wall to provide therethrough access to the electrical conductors; wherein the raceway system further comprises a plurality of electrical service conductors disposed within a first of the raceway upper portions and a first outlet junction box; wherein the raceway system further comprises a plurality of communications service conductors disposed within a second of the raceway upper portions and a second outlet junction box.

7. The raceway system of claim 6, wherein the substantially U-shaped raceway is formed of two substantially L-shaped portions.

8. The raceway system of claim 6, wherein the substantially U-shaped raceway is disposed in a cavity formed between two studs in the wall.

9. A method for installing a raceway system for electrical conductors in a wall, the method comprising: providing a first elongated raceway configured for passing electrical power conductors therethrough, the first elongated raceway comprising an upper portion configured to mechanically cooperate with a first mounting junction box and a lower portion configured to mechanically cooperate with a first outlet junction box; securing the first elongated raceway to the first stud within the wall; providing a second elongated raceway configured for passing electrical signal conductors therethrough, the second elongated raceway comprising an upper portion configured to mechanically cooperate with a second mounting junction box and a lower portion configured to mechanically cooperate with a second outlet junction box; and securing the second elongated raceway to the second stud within the wall.

10. The method of claim 9, wherein said first elongated raceway is secured to said stud within said wall using a first clip configured to flexibly receive the first elongated raceway.

11. The method of claim 9, further comprising a respective first or second outlet junction box coupled to the lower portion of at least one of the first and second elongated raceways, each outlet junction box configured for attachment to an inside surface of the wall to provide therethrough access to the electrical conductors.

12. The method of claim 9, further comprising a respective first or second mounting junction box coupled to the upper portion of at least one of the first and second elongated raceways, each mounting junction box configured for attachment to an upper support member within the wall.

13. The method of claim 9, wherein said second elongated raceway is secured to said second stud within said wall using a clip configured to flexibly receive the second elongated raceway.

14. A method for installing a raceway system for electrical conductors within a wall, the method comprising: providing a substantially U-shaped raceway configured for installation between adjacent studs within a wall, the raceway comprising two upper portions and a lower portion coupled therebetween for passing electrical conductors therethrough each of the upper portions having an end configured to mechanically cooperate with a respective mounting junction box; providing at least on fastener for each of the upper portions to secure the upper portion of a respective one of the adjacent studs within the wall; the lower portion including at least one outlet junction box configured for attachment to an inside surface of the wall to provide therethrough access to the electrical conductors; wherein the raceway system further comprises a plurality of electrical service conductors disposed within a first of the raceway upper portions and a first outlet junction box; wherein the raceway system further comprises a plurality of communications service conductors disposed within a second of the raceway upper portions and a second outlet junction box.

15. The method of claim 14, wherein the substantially U-shaped raceway is formed of two substantially L-shaped portions.

16. The method of claim 14, wherein the substantially U-shaped raceway is disposed in a cavity formed between two studs in the wall.

* * * * *